US008910698B2

United States Patent
Lin

(10) Patent No.: US 8,910,698 B2
(45) Date of Patent: Dec. 16, 2014

(54) SUNSHADE ASSEMBLY

(71) Applicant: Macauto Industrial Co., Ltd., Tainan (TW)

(72) Inventor: Paul Lin, Tainan (TW)

(73) Assignee: Macauto Industrial Co., Ltd., Tainan (TW)

( * ) Notice: Subject to any disclaimer, the term of this patent is extended or adjusted under 35 U.S.C. 154(b) by 0 days.

(21) Appl. No.: 13/895,018

(22) Filed: May 15, 2013

(65) Prior Publication Data
US 2013/0320701 A1 Dec. 5, 2013

(30) Foreign Application Priority Data
Jun. 5, 2012 (TW) .............................. 101210824 A

(51) Int. Cl.
*B60J 1/18* (2006.01)
*B60J 3/02* (2006.01)
*B60J 1/20* (2006.01)

(52) U.S. Cl.
CPC ...... *B60J 3/02* (2013.01); *B60J 1/2019* (2013.01); *B60J 1/2044* (2013.01); *B60J 1/2055* (2013.01)
USPC .................................... 160/370.22; 296/97.8

(58) Field of Classification Search
USPC ............ 160/370.22, 66, 290.1, 383, 392, 68; 296/97.8, 143, 219, 37.16

IPC .......... B60J 1/208,1/2044, 7/0015; B60R 5/047
See application file for complete search history.

(56) References Cited

U.S. PATENT DOCUMENTS

| | | | | |
|---|---|---|---|---|
| 3,524,491 | A * | 8/1970 | Olson | 160/393 |
| 3,724,524 | A * | 4/1973 | Potter | 160/24 |
| 6,257,647 | B1 * | 7/2001 | Ninness et al. | 296/100.15 |
| 6,463,983 | B1 * | 10/2002 | Lang | 160/23.1 |
| 7,669,635 | B2 * | 3/2010 | Thumm | 160/290.1 |
| 8,016,013 | B2 * | 9/2011 | Horvath | 160/23.1 |
| 8,672,016 | B2 * | 3/2014 | Busha et al. | 160/370.22 |
| 2007/0007783 | A1 * | 1/2007 | Schlecht | 296/24.4 |
| 2009/0102226 | A1 * | 4/2009 | Busha et al. | 296/97.8 |

* cited by examiner

*Primary Examiner* — David Purol
(74) *Attorney, Agent, or Firm* — Frommer Lawrence & Haug LLP; Ronald R Santucci

(57) ABSTRACT

A sunshade assembly includes a mounting seat, a reeling shaft rotatably mounted to the mounting seat, a foldable shade member connected to the reeling shaft and having an expandable end section that has two side portions and a center portion interconnecting the side portions, a sidebar formed with a first receiving groove that is engaged with the center portion of the expandable end section, and two end components connected respectively to opposite ends of the sidebar. Each of the end components is formed with a second receiving groove in spatial communication with the first receiving groove and engaged with a respective one of the side portions of the expandable end section.

4 Claims, 6 Drawing Sheets

SUNSHADE ASSEMBLY

CROSS-REFERENCE TO RELATED APPLICATION

This application claims priority of Taiwanese Patent Application No. 101210824, filed on Jun. 5, 2012.

BACKGROUND OF THE INVENTION

1. Field of the Invention

The invention relates to a sunshade assembly, more particularly to a sunshade assembly adapted for use with a vehicle.

2. Description of the Related Art

In order to avoid direct sunlight from penetrating through a vehicle window and affecting the comfort of a passenger, the vehicle generally has a window tint adhered to the vehicle window, and might additionally have a sunshade installed that covers the vehicle window and blocks the sunlight, thereby enhancing the shading effect.

Referring to FIGS. 1 and 2, a conventional sunshade 1 is mounted near a vehicle window 10, and includes a mounting seat 11, a reeling shaft 12 that is rotatably mounted to the mounting seat 11 and that extends in an extending direction, a foldable shade member 13 that is connected to the reeling shaft 12 and that has an expandable end section 131 extending in the extending direction and spaced apart from the reeling shaft 12, a sidebar 14 that is mounted to the expandable end section 131, and two end components 15 that are coupled respectively to opposite ends of the sidebar 14 in the extending direction.

When in use, the sidebar 14 is moved to unfold the shade member 13 for covering the vehicle window 10. However, since the end components 15 are only configured to be coupled to the sidebar 14 and are unable to be mounted with the shade member 13, the expandable end section 131 is mounted only on the sidebar 14, i.e., the length of the expandable end section 131 in the extending direction is equal to that of the sidebar 14. As a result, with the provision of the end components 15, a gap (D) will be formed between each of opposite sides 132 of the shade member 13 in the extending direction and a corresponding one of opposite sides of the vehicle window 10 allowing for passage of sunlight, thereby providing poor shading effect.

SUMMARY OF THE INVENTION

Therefore, the object of the present invention is to provide a sunshade assembly that can provide effective shading for a vehicle window.

According to the present invention, there is provided a sunshade assembly including amounting seat, a reeling shaft, a foldable shade member, a sidebar, and two end components. The reeling shaft extends in an extending direction and is rotatably mounted to the mounting seat. The foldable shade member is connected to the reeling shaft, and has an expandable end section extending in the extending direction and spaced apart from the reeling shaft in a first transverse direction that is transverse to the extending direction. The expandable end section has two side portions that are spaced apart from each other in the extending direction, and a center portion that interconnects the side portions. The sidebar extends along the extending direction, and is provided with a first receiving groove that extends through opposite ends of the sidebar in the extending direction and that is engaged with the center portion of the expandable end section of the shade member. The two end components are connected respectively to the opposite ends of the sidebar. Each of the end components is provided with a second receiving groove that is in spatial communication with the first receiving groove and that is engaged with a respective one of the side portions of the expandable end section of the shade member.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
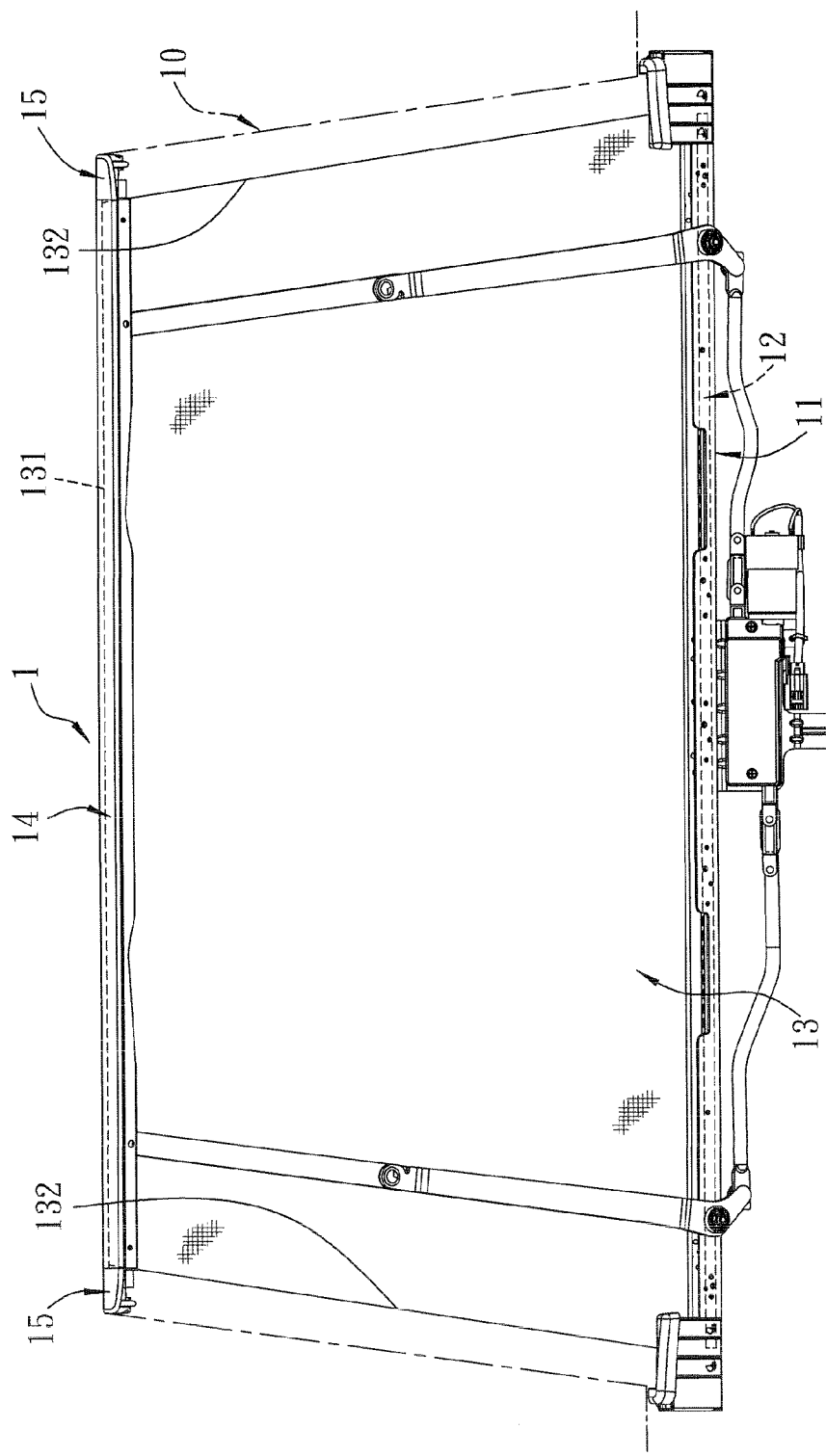
FIG. 1 is a side view of a conventional sunshade.
Figure 2:
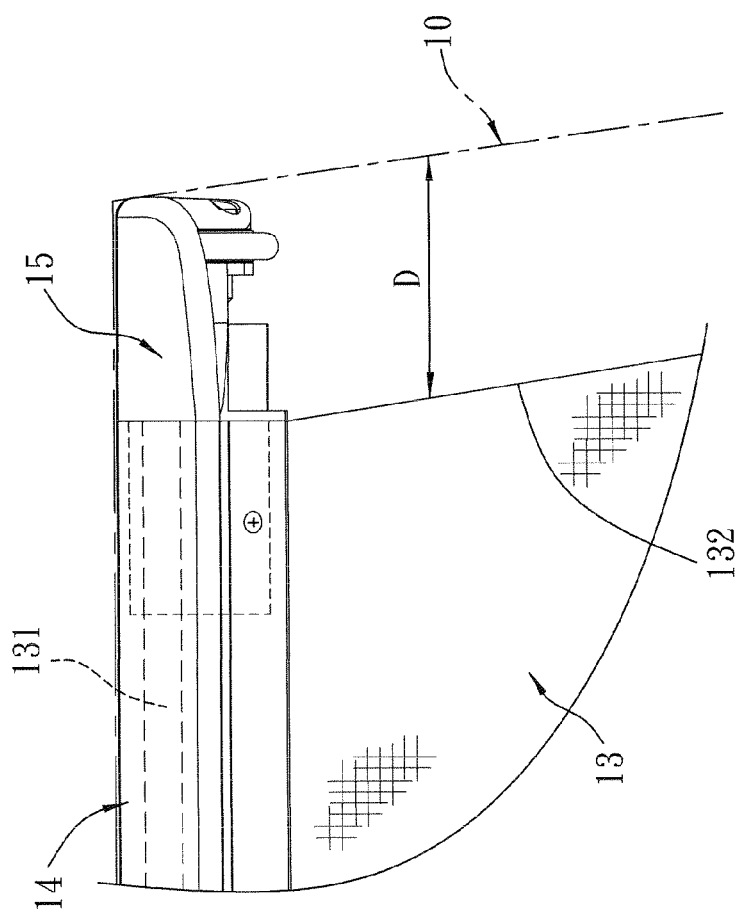
FIG. 2 is an enlarged fragmentary side view of the conventional sunshade.
Figure 3:
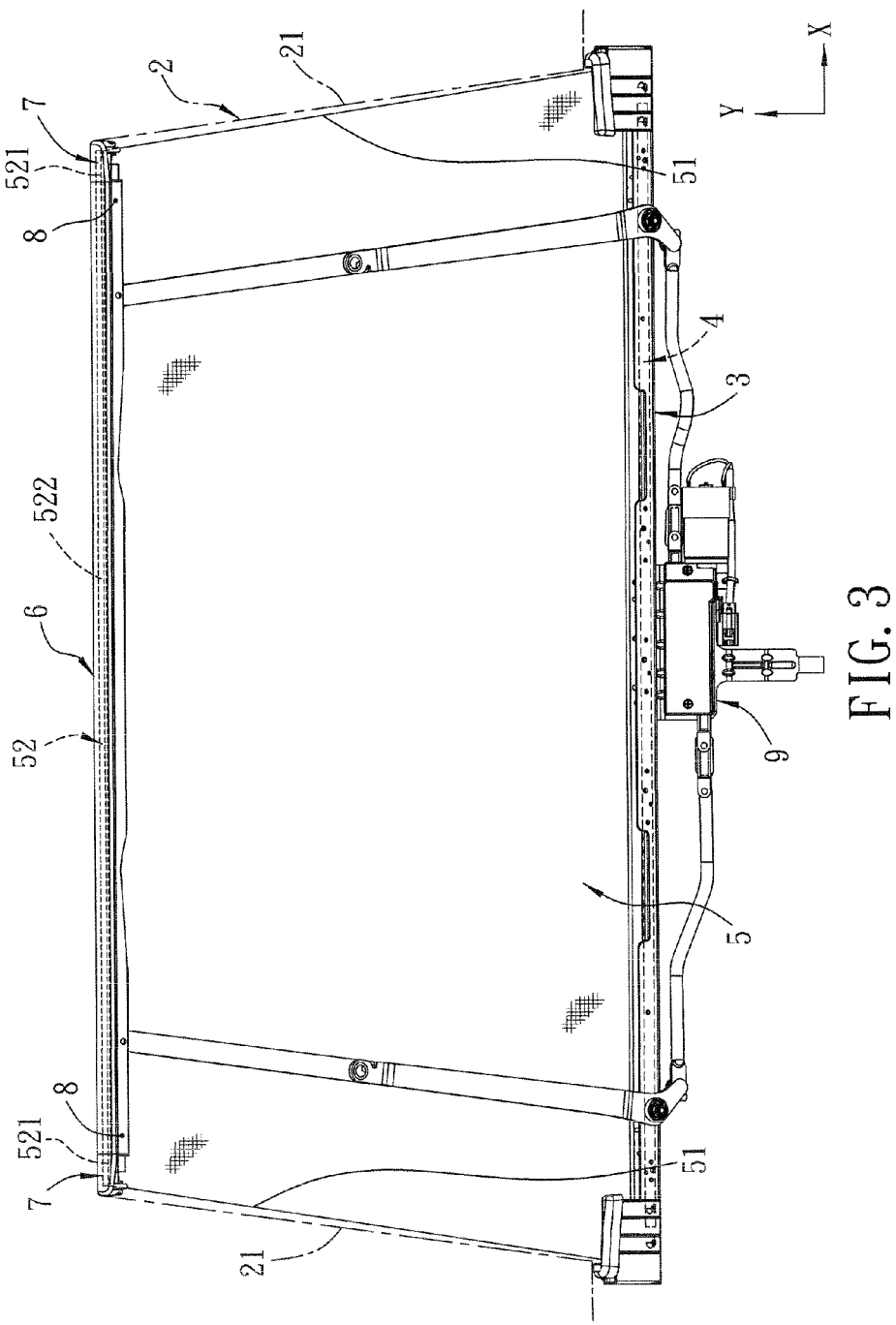
FIG. 3 is a side view of a preferred embodiment of a sunshade assembly according to the present invention.
Figure 4:
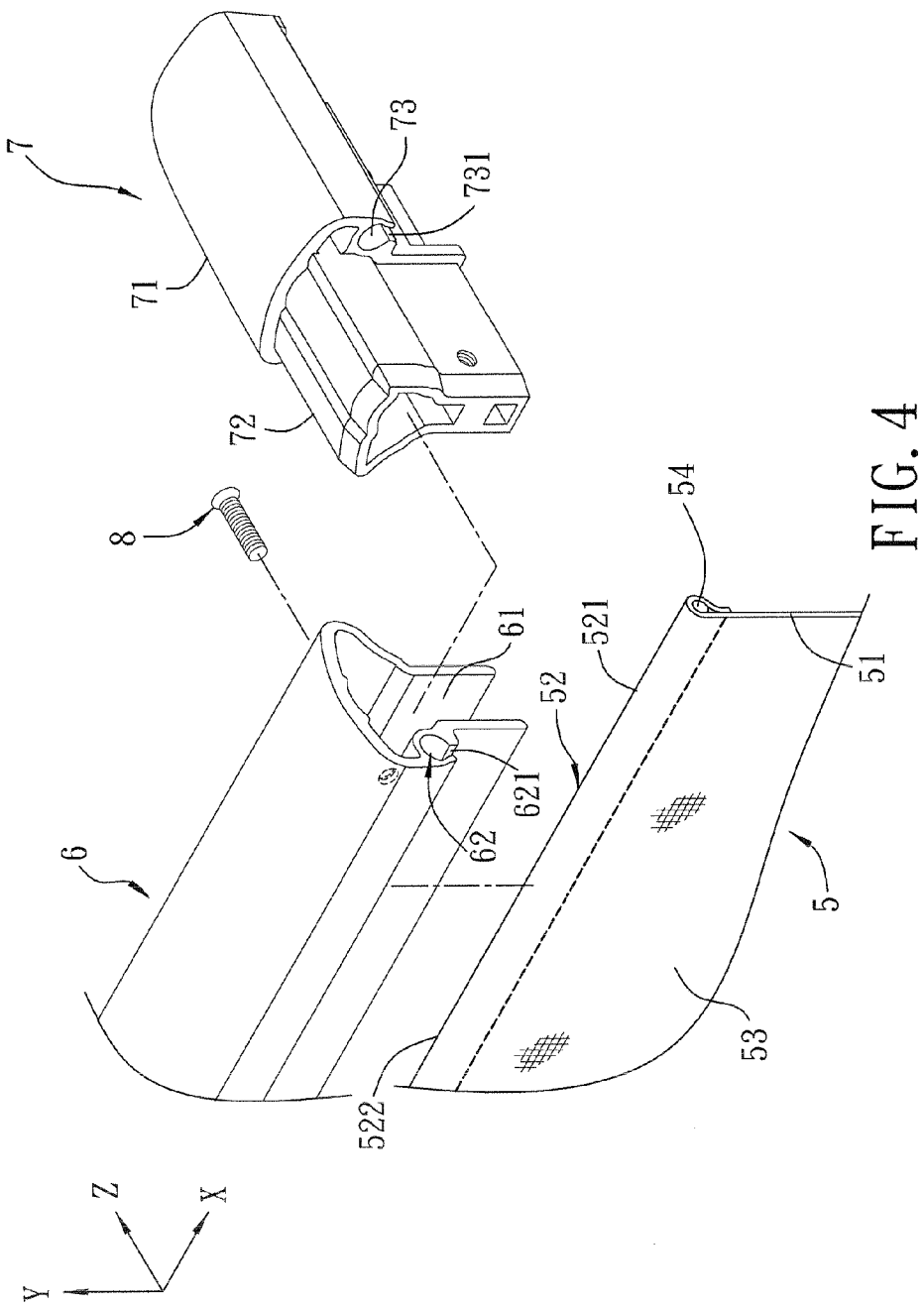
FIG. 4 is a fragmentary exploded perspective view of the preferred embodiment.
Figure 5:
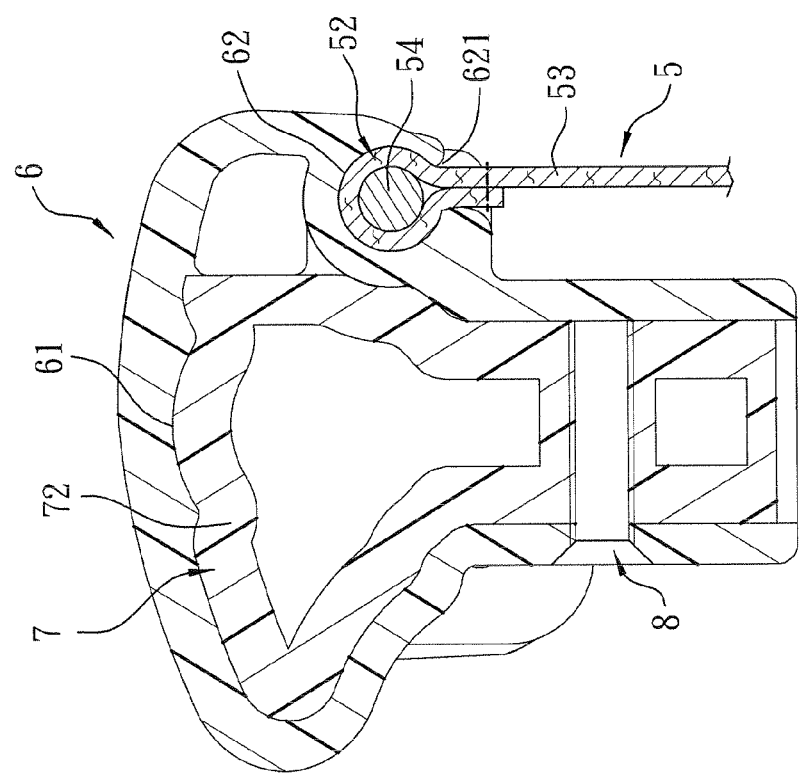
FIG. 5 is a fragmentary sectional view of the preferred embodiment.

Referring to FIGS. 3 to 5, the preferred embodiment of a sunshade assembly according to the present invention is adapted to be mounted in a vehicle (not shown) to cover a vehicle window 2. The vehicle window 2 is a rear windshield in this embodiment, and may be a sunroof or a side window; therefore, the positioning of the sunshade assembly is not limited to this embodiment. The sunshade assembly includes a mounting seat 3, a reeling shaft 4, a shade member 5, a sidebar 6, two end components 7 and two locking members 8.

The mounting seat 3 is a hollow body mounted under the vehicle window 2. The configuration of the mounting seat 3 may vary in other embodiments of the present invention.

The reeling shaft 4 extends in an extending direction (X) and is rotatably mounted to the mounting seat 3.

The foldable shade member 5 is connected to the reeling shaft 4 and has an expandable end section 52, a main section 53, and an insertion rod 54.

The expandable end section 52 extends in the extending direction (X) and is spaced apart from the reeling shaft 4 in a first transverse direction (Y) that is transverse to the extending direction (X). The expandable end section 52 has two side portions 521 that are spaced apart from each other in the extending direction (X), and a center portion 522 that interconnects the side portions 521. The main section 53 interconnects the end section 52 and the reeling shaft 4. In this embodiment, the expandable end section 52 is folded to form a sleeve, such that the main section 53 has a thickness in a second transverse direction (Z) transverse to the extending direction (X) and the first transverse direction (Y) which is smaller than that of the expandable end section 52. The insertion rod 54 is sleeved in the expandable end section 52 of the shade member 5 and is used for supporting the main section 53. The sunshade assembly further includes a torsion spring (not shown) for biasing the reeling shaft 4 to rotate for retracting the shade member 5.

The sidebar 6 extends along the extending direction (X), and is formed with a main groove 61 and a first receiving groove 62 spaced apart from the main groove 61. The main groove 61 extends through opposite ends of the sidebar 6 in the extending direction (X). The first receiving groove 62 extends through the opposite ends of the sidebar 6 in the extending direction (X), and is engaged with the center portion 522 of the expandable end section 52 of the shade member 5. The first receiving groove 62 has a first opening 621 for extension of the center portion 522 of the expandable end section 52.

The end components 7 are connected respectively to the opposite ends of the sidebar 6. Each of the end components 7 has an end segment 71 that abuts against a respective one of the opposite ends of the sidebar 6, and an insertion segment 72 that projects from the end segment 71 and that is inserted into the main groove 61. Each of the end components 7 is formed with a second receiving groove 73 that is in spatial communication with the first receiving groove 62, and that is engaged with a respective one of the side portions 521 of the expandable end section 52 of the shade member 5. The second receiving groove 73 of each of the end components 7 is disposed in the end segment 71 of the end component 7, and has a second opening 731 for extension of the respective one of the side portions 521 of the expandable end section 52.

The locking members 8 respectively secure the end components 7 with the sidebar 6. Each locking member 8 is a screw and is screwed into the sidebar 6 and the insert segment 72 of a respective one of the end components 7. The configuration of the locking members 8 may vary, and the quantity of the locking members 8 may increase to enhance the connection strength between the end components 7 and the sidebar 6.

The sunshade assembly further includes a drive unit 9 mounted to the mounting seat 3 and driving the sidebar 6 into motion. In this embodiment, the drive unit 9 is electrically controlled for unfolding and folding the shade member 5 via the movement of the sidebar 6. The design of the drive unit 9 may, in other embodiments be manual, semi-automatic and so forth. In addition, the sunshade assembly may further include two guide rails (not shown) engaging respectively the end segments 71 of the end components 7 for guiding movement of the end components 7 during the folding and unfolding of the shade member 5.

Figure 6:
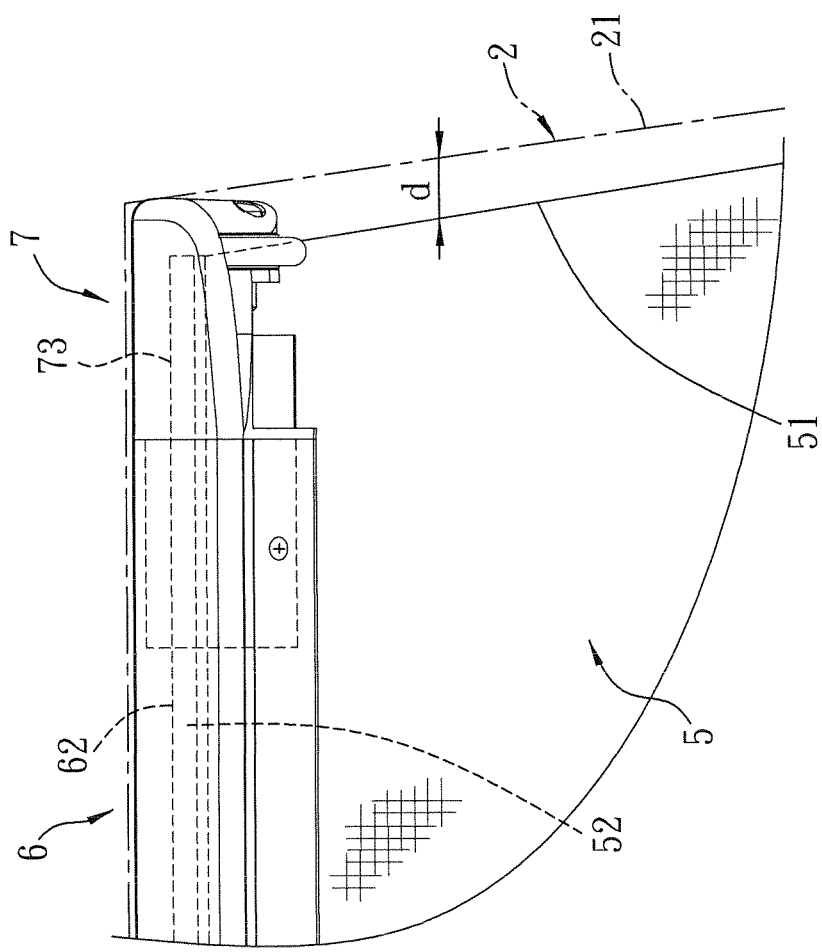
FIG. 6 is an enlarged fragmentary side view of the preferred embodiment.

Referring to FIGS. 3, 4 and 6, when in use, the drive unit 9 may be activated to move the sidebar 6 with respect to the mounting seat 3 to an expanded position distal to the reeling shaft 4 for expanding the shade member 5 to cover the vehicle window 2 and block the sunlight. The provision of the second receiving grooves 73 of the end components 7 that respectively engage with the side portions 521 of the shade member 5 allows a relatively wide shade member 5 to be coupled to the sidebar 6 and the end components 7 with lateral edges 51 of the shade member 5 being close to opposite sides 21 of the vehicle window 2 in the extending direction (X). Accordingly, a gap (d) formed between each of the opposite sides 21 of the vehicle window 2 and the respective side 51 of the shade member 5 is shorter than the gap (D) mentioned in the prior art, thereby increasing the area of coverage and enhancing the shading effect.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A sunshade assembly comprising:
a mounting seat;
a reeling shaft that extends in an extending direction and that is rotatably mounted to said mounting seat;
a foldable shade member that is connected to said reeling shaft and that has an expandable end section extending in the extending direction and spaced apart from said reeling shaft in a first transverse direction that is transverse to the extending direction, said expandable end section having two side portions that are spaced apart from each other in the extending direction, and a center portion that interconnects said side portions; a sidebar extending along the extending direction, and formed with a first receiving groove that extends through opposite ends of said sidebar in the extending direction and that is engaged with said center portion of said expandable end section of said shade member;
two end components connected respectively to said opposite ends of said sidebar, each of said end components being formed with a second receiving groove that is in spatial communication with said first receiving groove and that is engaged with a respective one of said side portions of said expandable end section of said shade member; and
wherein said sidebar is further formed with a main groove that extends through said opposite ends of said sidebar, each of said end components including an end segment that abuts against a respective one of said opposite ends of said sidebar, and an insert segment that projects from said end segment and that is inserted into said main groove.

2. The sunshade assembly as claimed in claim 1, wherein said shade member further has a main section that interconnects said expandable end section and said reeling shaft, and that has a thickness in a second transverse direction transverse to the extending direction and the first transverse direction which is smaller than that of said expandable end section, said first receiving groove of said sidebar having a first opening for extension of said center portion of said expandable end section, said second receiving groove of each of said end components having a second opening for extension of a respective one of said side portions of said expandable end section.

3. The sunshade assembly as claimed in claim 1, wherein said first receiving groove of said sidebar is spaced apart from said main groove, said second receiving groove of each of said end components being disposed in said end segment of a corresponding one of said end components.

4. The sunshade assembly as claimed in claim 1, further comprising two locking members, each of which secures a respective one of said opposite ends of said sidebar with a corresponding one of said end components.

* * * * *